United States Patent Office 3,189,606
Patented June 15, 1965

3,189,606
6α-AMINO-17-LOWERALKYLENEDIOXY-3,5-CYCLOANDROSTANES
John S. Tadanier, Chicago, and John Wayne Cole, Deerfield, Ill., assignors to Abbott Laboratories, North Chicago, Ill., a corporation of Illinois
No Drawing. Filed July 29, 1963, Ser. No. 298,459
9 Claims. (Cl. 260—239.55)

This application is a continuation-in-part of our earlier filed application, Serial No. 180,357, filed on March 16, 1962, now abandoned.

The present invention is concerned with new steroids. More particularly, it relates to 6-aminoandrostanes and the processes for their preparation.

The new compounds of the present invention are those of the formula:

(A)
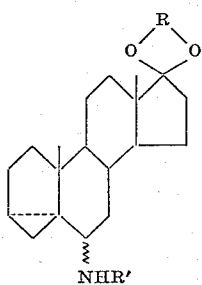

wherein R is an alkylene radical in which the valence bonds are separated by 2 or 3 carbon atoms and wherein R' represents hydrogen or acyl. The amino group or the substituted amino group in the 6-position of the steroid molecule can be of the α- or β-configuration.

The compounds of the present invention are pharmaceutically useful as endocrine agents, causing a favorable shift in anabolic/androgenic response as measured by the ratio of levator ani growth to prostate growth in warm-blooded animals. The new compounds are also valuable as chemical intermediates in the synthesis of other hormonal agents, e.g., the corresponding steroids with a 17-oxo group which are also hormonally active.

The present invention is also directed to a new group of steroid intermediates, mainly the 6-oximino-17-ethylenedioxy-3α,5α-cycloandrostane and the 6-oximino-17-propylenedioxy-3α,5α-cycloandrostane. These intermediates are precursors in the preparation of the 6α-amino-17-alkylenedioxy-3α,5α-cycloandrostanes and the corresponding N-acyl substituted derivatives thereof which are included in the above defined class of new steroids.

In the preparation of the compounds of Formula A wherein the 6-amino- or 6-acylamino- group is in the α-position, a 6-oxo-17-alkylenedioxy-3α,5α-cycloandrostane is converted to the corresponding oxime with hydroxylamine under conditions which permit the retention of the sensitive ketal group in the 17-position. Reduction of the 6-oximino-3α,5α-cycloandrostan-17-one ketals leads to 6α-amino-17-alkylenedioxy-3α,5α-cycloandrostanes which can be acylated to the corresponding 6α-acylamino analogues.

For the preparation of the steroids of Formula A wherein the 6-amino group is in the β-position, a sulfonic ester of a 3β-hydroxy-17-alkylenedioxyandrost-5-ene is used as starting material. By treating this material with ammonia, a 6β-amino-3α,5α-cycloandrostan-17-one ketal is obtained. This amine can be acylated by standard procedures to yield the corresponding 6β-acylamino-3α,5α-cycloandrostan-17-one ketal.

The above procedures for making compounds of Formula A teach a general method of forming a 6-amino-3,5-cyclosteroid structure while retaining in the 17-position a useful functional group which can be subsequently converted to a keto group or which can be retained during the acylation step whereby a 6β-acylamino steroid is obtained.

The present invention is more specifically explained by reference to the following examples which are given here as illustrations only and are not meant to limit the present invention in any manner.

EXAMPLE 1

*6-oximino-17-ethylenedioxy-3α,5α-cycloandrostane*

A solution prepared from 4.8 grams of 17-ethylenedioxy-3α,5α-cycloandrostan-6-one, 5.0 grams of hydroxylamine hydrochloride, and 200 ml. of pyridine, is heated on a steam bath for 3 hours. After cooling, the mixture is diluted with 1.2 liters of water and extracted with ether. The ether extract is washed with water and dried over magnesium sulfate. The solvent is evaporated and the residue is crystallized from aqueous ethanol to obtain crystals of 6-oximino-17-ethylenedioxy-3α,5α-cycloandrostane. The crystals are separated by filtration, washed with aqueous ethanol, and dried, to yield 4.18 grams of this new intermediate, melting at 182–6° C. A portion of this product is recrystallized to obtain an analytical sample, melting at 186–7° C., of which the obtained analytical values correspond with the calculated values for 6-oximino-17-ethylenedioxy-3α,5α-cycloandrostane, with the empirical formula $C_{21}H_{31}O_3N$.

EXAMPLE 2

*6α-amino-17-ethylenedioxy-3α,5α-cycloandrostane*

A solution of 4.1 grams of 6-oximino-17-ethylenedioxy-3α,5α-cycloandrostane in 400 ml. of anhydrous ethanol is heated under reflux while 36 grams of metallic sodium is added portionwise in the course of 90 minutes. After a further 60 minutes of refluxing, the warm reaction mixture is diluted with 200 ml. of anhydrous ethanol and filtered through a sintered glass funnel. The filtrate is cooled by the addition of ice and 2 liters of cold water and is subsequently extracted with ether. The ether extract is washed with water and then dried over magnesium sulfate. The ether is evaporated, leaving 4.33 grams of a viscous, pale-yellow oil. This oil is dissolved in 80 ml. of ether, to which solution 2.5 ml. of glacial acetic acid is added and the resulting solution is agitated until homogeneous. The solution is then diluted to 200 ml. with water and extracted twice with 200-ml. portions of ether. The ether solutions are washed in series with two 150-ml. portions of water which are added to the original aqueous extract. The resulting aqueous solution containing the acetic acid salt of the amine is treated with 200 ml. of 5% sodium hydroxide solution and extracted with ether. The ether solution is washed with water and dried over magnesium sulfate. The ether is evaporated, leaving 2.83 grams of 6α-amino-17-ethylenedioxy-3α,5α-cycloandrostane identified by the infrared spectrum and characterized by conversion to other derivatives.

EXAMPLE 3

*6α-acetamido-17-ethylenedioxy-3α,5α-cycloandrostane*

A solution prepared from 1.6 grams of 6α-amino-17-ethylenedioxy-3α,5α-cycloandrostane of Example 2, 36 ml. of pyridine, and 12 ml. of acetic anhydride is kept at room temperature overnight. The resulting solution is then poured into 400 ml. of water and the white solid which separates is collected by filtration on a sintered glass funnel. This material is taken up in 200 ml. of chloroform. The chloroform solution is washed with two 100-ml. portions of water and dried over magnesium sulfate. The chloroform is evaporated and the residue is crystallized and recrystallized from ether-pentane solution to yield 6α-acetamido-17-ethylenedioxy-3α,5α-cycloandrostane which separates from the crystallization medium as a white gel which converts to a finely divided white solid on filtration. After drying, the product melts at 193–7° C. The product is identified by its infrared absorption pattern and elemental analysis which is in accord with the empirical formula $C_{23}H_{35}O_3N$.

EXAMPLE 4

*6α-p-nitrobenzamido-17-ethylenedioxy-3α,5α-cycloandrostane*

6α-amino-17-ethylenedioxy-3α,5α-cycloandrostane, prepared as described in Example 2, is stirred at room temperature with a mixture of 5% aqueous sodium hydroxide, benzene, and excess nitrobenzoyl chloride. The benzene solution is separated, washed with water and dried over anhydrous magnesium sulfate. The solvent is evaporated and the residue is recrystallized from ethanol/water to yield pure 6α-p-nitrobenzamido-17-ethylenedioxy-3α,5α-cycloandrostane. The elemental analysis is in accord with the empirical formula $C_{28}H_{36}O_5N_2$.

EXAMPLE 5

*6α-propionamido-17-ethylenedioxy-3α,5α-cycloandrostane*

When the procedure of Example 3 is repeated, but using 14 ml. of propionic acid anhydride in place of 5 ml. of acetic anhydride, the product obtained is 6α-propionamido-17-ethylenedioxy-3α,5α-cycloandrostane, which is identified by infrared absorption spectrum and the elemental analysis which corresponds to the empirical formula $C_{24}H_{37}O_3N$.

EXAMPLE 6

*6-oximino-17-propylenedioxy-3α,5α-cycloandrostane*

3β-hydroxy-17-(1,3-propylenedioxy)-androst-5-ene is prepared by treating 3β-hydroxyandrost-5-en-17-one with 1,3-propylene glycol in the presence of a catalytic amount of p-toluenesulfonic acid according to the general procedure for making propylenedioxy steroids which is described in U.S. 2,302,636. This product is converted to 3β-p-toluenesulfonoxy-17-(1,3-propylenedioxy)-androst-5-ene by treatment with p-toluenesulfonyl chloride in pyridine. The p-toluenesulfonate is converted by hydrolysis to the 6β-hydroxy compound which is oxidized to 17-(1,3-propylenedioxy)-3α,5α-cycloandrostan-6-one according to the procedure described in Bull. Soc. Chim. France, 1960, pp. 298–9. The analytical values of this ketone are in accord with the empirical formula $C_{22}H_{32}O_3$.

The 17-(1,3-propylenedioxy)-3α,5α-cycloandrostan-6-one is converted by the procedure of Example 1 into 6-oximino-17-(1,3-propylenedioxy)-3α,5α-cycloandrostane. The analytical results are in accord with the empirical formula $C_{22}H_{33}O_3N$.

EXAMPLE 7

*6α-amino-17-(1,3-propylenedioxy)-3α,5α-cycloandrostane*

A solution of 4 grams of the 6-oximino-17-propylenedioxy-3α,5α-cycloandrostane of Example 6 in 400 ml. of anhydrous ethanol is reduced by portionwise addition of 36 grams of sodium. The reaction mixture is worked up according to the process described in Example 2, to yield 6α-amino-17-propylenedioxy-3α,5α-cycloandrostane, of which the analytical values correspond to those for the empirical formula $C_{22}H_{35}O_2N$.

This amine is converted by the procedures of Examples 3, 4 and 5 into the following new compounds:

6α-acetamido-17-propylenedioxy-3α,5α-cycloandrostane,
6α-p-nitrobenzamido-17-propylenedioxy-3α,5α-cycloandrostane,
6α-propionamido-17-propylenedioxy-3α,5α-cycloandrostane, respectively.

EXAMPLE 8

*6β-amino-17-ethylenedioxy-3α,5α-cycloandrostane*

A mixture of 15 grams of 3β-p-toluenesulfonoxy-17-ethylenedioxyandrost-5-ene described in Bull. Soc. Chim. France, 1960, page 298, and 60 ml. of liquid ammonia is heated in a pressure vessel at 100° for 15 hours. The mixture is cooled and the excess ammonia is allowed to evaporate. The residue is shaken with 300 ml. of ether and 200 ml. of 5% aqueous sodium hydroxide. The aqueous phase is separated and extracted with 200 ml. of ether. The ether solutions are washed separately with water, combined, and dried over anhydrous magnesium sulfate. The solvent is evaporated, leaving 9.4 grams of an oil.

This crude product is dissolved in a solution prepared from 30 ml. of methanol and 3 ml. of glacial acetic acid. The resulting solution is shaken with 300 ml. of ether and 200 ml. of water. The aqueous layer is separated and extracted with 200 ml. of ether. The ether solutions are washed in series with three 100-ml. portions of water and the aqueous washings are added to the original aqueous extract.

The resulting aqueous solution containing the water-soluble mixture of acetic acid salts is shaken with 300 ml. of ether and 200 ml. of 5% aqueous sodium hydroxide. The aqueous phase is separated and the ether solution is washed with water and dried over magnesium sulfate. The ether is evaporated leaving 6.9 grams of a crystalline residue. Recrystallization of this material from pentane yields a first crop of 2.4 grams of 6β-amino-17-ethylenedioxy-3α,5α-cycloandrostane melting at 100–110°. Further recrystallization of the product from pentane yields the pure amine melting at 108–110° which has an $[\alpha]_D^{23}$ of +18° as a 1% solution in chloroform. The analytical values are in agreement with the empirical formula $C_{21}H_{33}O_2N$.

The mother liquor from the above crystallization is further processed to obtain additional 6β-amino-17-ethylenedioxy-3α,5α-cycloandrostane after removal of the isomeric 3α- and 3β-amino-17-ethylenedioxyandrost-5-ene which are formed as by-products. The 3β-amine is separated as the acetic acid salt by crystallization from methanol. The acetic acid salt of the 3α-amine is separated by crystallization from ether/pentane. The isomeric 3-amino compounds are distinguished from the 6β-amine by their low optical rotations and nuclear magnetic resonance spectra.

EXAMPLE 9

*6β-acetamido-17-ethylenedioxy-3α,5α-cycloandrostane*

To a solution of 1.03 grams of 6β-amino-17-ethylenedioxy-3α,5α-cycloandrostane from Example 8 in 25 ml. of pyridine is added 8 ml. of acetic anhydride. The resulting solution is allowed to stand 24 hours at room temperature and is then shaken with 250 ml. of water and 250 ml. of ether. The ether solution is worked up according to the procedure of Example 3 and the resulting 6β - acetamido - 17 - ethylenedioxy - 3α,5α - cycloandrostane is recrystallized from benzene/Skellysolve B (1:1) to yield 1.05 grams of pure material melting at 158–160° C. The infrared absorption pattern is consistent with functional groups present and the analytical values are in agreement with the empirical formula $C_{23}H_{35}O_3N$.

EXAMPLE 10

*6β-p-nitrobenzamido-17-ethylenedioxy- (or propylenedioxy)-3α,5α-cycloandrostane)*

By following the procedure described in Example 4 but using 6β - amino-17-ethylenedioxy-3α,5α-cycloandrostane as the starting material, 6β-p-nitrobenzamido-17-ethylenedioxy-3α,5α-cycloandrostane of empirical formula $C_{28}H_{36}O_5N_2$ is obtained.

The same procedure produces 6β-p-nitrobenzamide-17-(1,2- or 1,3-propylenedioxy)-3α,5α-cycloandrostane when the corresponding acetals are used as starting materials.

It will be apparent to those skilled in the art that the procedures of this invention are applicable to steroids having various ketal structures at the 17-position. It is known that the following glycols may be used for preparing such ketal structures:

Ethylene glycol (giving ethylenedioxy structures as described in Example 1)
1,2-propylene glycol (see J. Med. Pharm. Chem. 5 133, 1962)
1,3-propylene glycol (as in Example 6 above)
2,2-dimethylpropane-1,3-diol (see U.S. 2,960,502)
2,3-butanediol (see Can. J. Technology 29, 243, 1951)

The ketal structures useful as endocrine agents are the 6-amino steroids having in the 17-position an alkylenedioxy group of the structure —O(CH₂)ₙO— wherein *n* is 2 or 3 and wherein the alkylene hydrogens may be replaced by methyl groups.

From the free 6α-amino or 6β-amino steroids described above, carrying in the 17-position the alkylenedioxy structure, the amino group may be substituted in the manner shown above by a great variety of acyl groups. Among the acyl groups suitable as substituents R′ of Formula A are acetyl, propionyl, 3-carboxypropionyl, butyryl, hexanoyl, benzoyl, p-nitrobenzoyl, p-methoxybenzoyl, 3,4-dimethoxybenzoyl, 3,4,5-trimethoxybenzoyl, cyclopentanoyl, p-acetylaminobenzoyl, various halobenzoyls, p-toluoyl, cyclohexanoyl, phenylacetyl, alkylaminophenyl, isobutyryl, etc.

In other words, the substituent R′ in Formula A may be hydrogen or R″CO wherein R″ is loweralkyl, carboxyalkyl, benzyl, phenyl and phenyl carrying one or more monovalent substituents from the class of halogen, nitro, loweralkyl, loweralkoxy, loweralkoylamino and loweralkylamino.

Others may practice the invention in any of the numerous ways which will be suggested to one skilled in the art by the present disclosure. All such practice of the invention is considered a part hereof provided it falls within the scope of the appended claims.

We claim:
1. A steroid of the formula

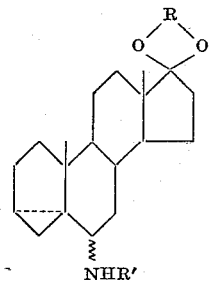

wherein R′ is selected from the group consisting of hydrogen and lower fatty acid acyl, and wherein R is an alkylene group in which the valence bonds are separated by 2–3 carbon atoms.

2. A steroid of the formula

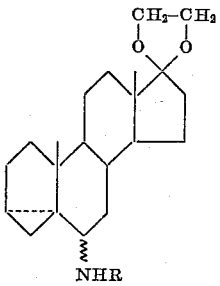

wherein R is selected from the group consisting of hydrogen and lower fatty acid acyl.

3. 6α-amino-17-ethylenedioxy-3α,5α-cycloandrostane.
4. 6β-amino-17-ethylenedioxy-3α,5α-cycloandrostane.
5. 6α - acetamido - 17 - ethylenedioxy - 3α,5α - cycloandrostane.
6. 6β - acetamido-17 - ethylenedioxy - 3α,5α - cycloandrostane.
7. 6-oximino-17-ethylenedioxy-3α,5α-cycloandrostane.
8. The process comprising the steps of
heating a 17-alkylenedioxy-3α,5α-cycloandrostan-6-one with an excess of hydroxylamine until the 6-oximino-17-alkylenedioxy-3α,5α-cycloandrostane is formed,
separating said 6-oximino-compound,
reducing said 6-oximino-compound in an alcoholic solution in the presence of an alkali metal, and
isolating the formed 6α-amino-17-alkylenedioxy-3α,5α-cycloandrostane from the reaction mixture.
9. The process of claim 8 wherein said 17-alkylenedioxy-3α,5α-cycloandrostan-6-one is 17-ethylenedioxy-3α,5α-cycloandrostan-6-one.

References Cited by the Examiner

UNITED STATES PATENTS 2,446,538    8/48    Julian et al. _____ 260—397.5

OTHER REFERENCES

"Advanced Organic Chemistry," 1961, pp. 432 and 842, Reinhold Publishing Corp., New York, N. Y.

LEWIS GOTTS, *Primary Examiner.*